T. Robjohn,
Inkstand.
No. 729. Reissued May 24. 1859.
FIG. I
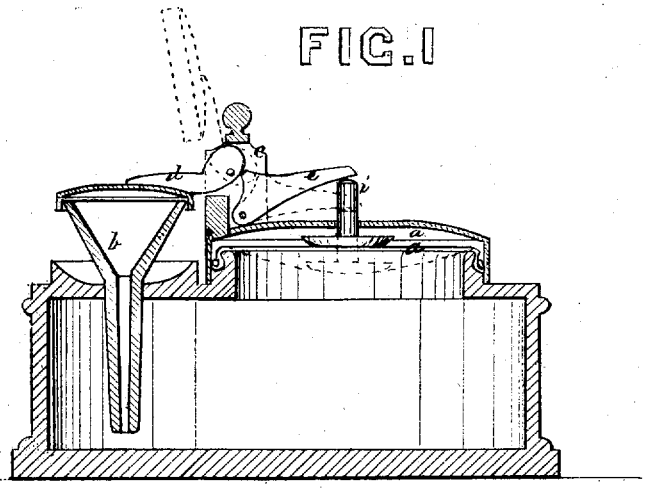
FIG. II
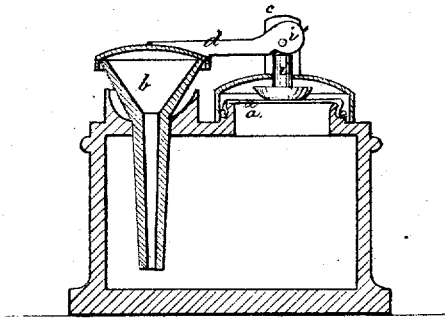
N. PETERS, PHOTO-LITHOGRAPHER, WASHINGTON, D. C.

UNITED STATES PATENT OFFICE.

THOMAS ROBJOHN, OF NEW YORK, N. Y.

IMPROVEMENT IN INKSTANDS.

Specification forming part of Letters Patent No. 18,060, dated August 25, 1857; Reissue No. 729, dated May 24, 1859.

*To all whom it may concern:*

Be it known that I, THOMAS ROBJOHN, of the city, county, and State of New York, have invented certain new and useful Improvements in Inkstands; and I do hereby declare that the following is a full, clear, and exact description of the same, reference being had to the annexed drawings, making a part of this specification, in which—

Figure 1 is a transverse vertical section of my inkstand. Fig. 2 is an illustration of a modification thereof; and similar letters indicate similar parts throughout.

My improvements in inkstands have reference to that class wherein the ink is forced up through a tube into a cup placed outside of the ink-reservoir and above it by means of the compression of the air within the vessel itself. The mode of accomplishing this is, in the old way, most commonly by turning the milled head of a screw, the end of which acts upon a flexible and elastic diaphragm placed over an opening in the inkstand. Several objections to this kind of inkstand are found; a serious one is the unprotected cup, which collects dust, and is consequently liable to have its supply-tube stopped. Another is the constant risk of overflowing the ink by screwing too rapidly or too far, and also of bursting the diaphragm and letting out the ink or other fluid.

The nature of my invention consists in an arrangement of mechanism, in connection with a cover for the ink-cup, whereby the operation of supplying ink to the cup or emptying it out shall be performed by raising or closing said cover. By this arrangement no more than the proper supply of ink can be raised on opening the cover, while the closing of the same after use will effect the emptying and securing of the cup against dust and consequent risk of obstruction to the tube.

Fig. 1 is a section view of an inkstand having at *a* a diaphragm of flexible material, generally gum-elastic, secured by cementing a metallic cap over it, as shown.

At *b* is the ink-cup, with its supply-tube terminating near the bottom of the ink-reservoir, and is of the construction usual in this kind of inkstand. Between this cup and the stud which works the diaphragm there is a post, *c*, to which the device for working the diaphragm is attached. This consists, in my improvement, of two levers, *d* and *e*, both hinged or pivoted in said post. These levers are crooked, so as to act upon each other, the lever *d* being of the first class and *e* of the second—that is to say, *d* has its fulcrum between its ends.

To *d* is attached a cover, made to fit the cup *b*, as shown, while the opposite end of *e* rests upon the top of a stud, *i*, which presses upon the diaphragm *a*, as shown. That end of the lever *d* which acts upon *e* is cam-shaped, and the projection on *e* against which it presses is also curved, the object of which is to arrest motion in *e* at a certain point, although *d* may still continue to move.

In order to operate the inkstand, lift the cover *d* off the cup, when it will stand in the position shown in the duplicate line; take out the cup *b*, and then pour in through the aperture thus opened sufficient ink to reach above the bottom of the tube, (one-half to two-thirds full is best,) replace *b*, and shut down the cover. Some additional bubbles of air will then pass in. Now, raise the cover once more, and the ink will rise to the proper height in *b*, for as the cover is lifted the lever *d* acts upon lever *e* and presses down the pin *i* and diaphragm the distance to compress the air within sufficiently to force up the proper supply of ink. If the continued use of ink is sufficiently great at any one time to exhaust the cup, the renewal is effected by closing the lid, when a few air-bubbles will again enter, and if now the lid be raised, the ink rises as before. This principle of action is also applicable to elastic inkstands, or those which are made of india-rubber, in which case the diaphragm may be made solid with the inkstand, or it may form only a detachable part of it, as exhibited in the drawings above referred to, substantially the same device being employed in either instance to raise and to discharge the supply of ink to the fountain.

I have described this improvement as for inkstands, but it is also adapted to other fluids—such as lubricating-oils, especially for watch-makers, and for perfumes, &c. A form I deem more suitable for these latter uses is represented in Fig. 2. In this case the lever attached to the cover is made to act directly upon the pressure-pin *i* by having its end formed into a cam, as at *i'*. The post *c* covers the pin and sets over it, as shown. In this form also this part cannot be tampered with, and hence is more secure against accidents.

What I claim as new, and desire to secure by Letters Patent, is—

1. The arrangement for flexing the elastic diaphragm by so attaching a mechanism in connection with the cover for the ink-cup that the opening and closing thereof shall effect the raising or discharge of the ink or other fluid into or from said cup, as specified.

2. The cover, arranged and operating as above set forth, in combination with the elastic or flexible diaphragm and a non corrosive fountain or ink-cup, when operating as and for the purposes hereinabove specified.

3. The combination and arrangement of cam-lever *d* and plunger *i*, or the equivalents thereof, for effecting the raising or discharge of the ink by raising or closing the cover of the non-corrosive fountain-cup, substantially as specified.

4. Arranging the cam-centers in such relation to each other that by raising the cover the requisite depression of the diaphragm will be produced to obtain the required result, as specified.

THOS. ROBJOHN.

Witnesses:
S. B. SAXTON,
J. S. CLEVELAND.